July 19, 1960 E. R. DIETRICH ET AL 2,945,701
PNEUMATIC VEHICLE SUSPENSION SYSTEM
Filed July 17, 1957 2 Sheets-Sheet 2

INVENTORS
Ezic R. Dietrich &
BY Edwin Gail Peckham
W. S. Pettigrew
ATTORNEY

United States Patent Office 2,945,701
Patented July 19, 1960

2,945,701

PNEUMATIC VEHICLE SUSPENSION SYSTEM

Eric R. Dietrich, Lapeer, and Edwin Gail Peckham, Flint, Mich., assignors to General Motors Corporation, Detroit, Mich., a corporation of Delaware Filed July 17, 1957, Ser. No. 672,425

10 Claims. (Cl. 280—124)

This invention relates to pneumatic vehicle suspension and more particularly to control apparatus therefor.

An object of the present invention is to provide an improved air suspension control system.

Another object is to provide an air suspension system incorporating means for preventing progressive departure of the sprung mass from the normal trim height as a result of prolonged uniform wheel oscillation.

Still another object is to provide an air suspension control system in which intake and exhaust of air by the springs during corresponding time intervals is substantially equal volumetrically.

A further object is to provide an air suspension control system including pressure regulating apparatus effective to establish substantially uniform intake to spring and spring to exhaust pressure differential ratio.

Still a further object is to provide an air suspension of the type having a high pressure network for supplying air to expansible springs and a low pressure network for receiving exhausted air therefrom wherein pressure regulating means are provided in both the high and low pressure networks, the respective regulators being adjusted to maintain a predetermined pressure in the respective networks such that the volume of air entering the springs during any given time interval will substantially equal the volume of air exhausted from said springs during the same period of time.

Yet a further object is to provide a system of the stated character which is effective to substantially reduce exhaust of air from one spring when the adjacent corner of the sprung mass is forcibly displaced from the associated vehicle wheel, as for example by a bumper jack.

A still further object is to provide an air suspension fluid control network employing a semi-closed circuit wherein the usual low pressure return tank is eliminated.

These and other objects, advantages and features of the invention will become more fully apparent as reference is had to the accompanying specification and drawings wherein.

form of operating connection between one of the leveling

Figure 3:
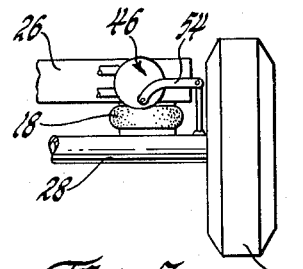
Figure 4:
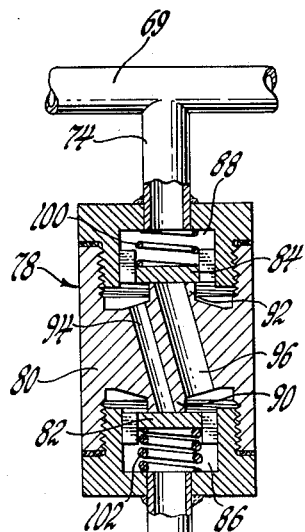
Figure 5:
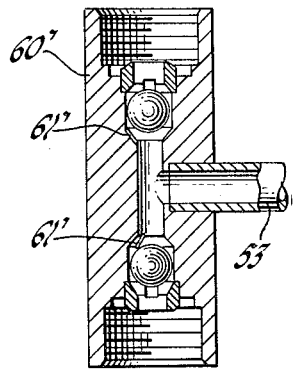

Fig. 3 is a diagrammatic view disclosing the general construction of the leveling control member;

Fig. 4 is a diagrammatic view of a two-way check valve associated with the distribution network; and Fig. 5 is a view illustrating the construction of a simplified cross flow restriction valve.

Figure 1:
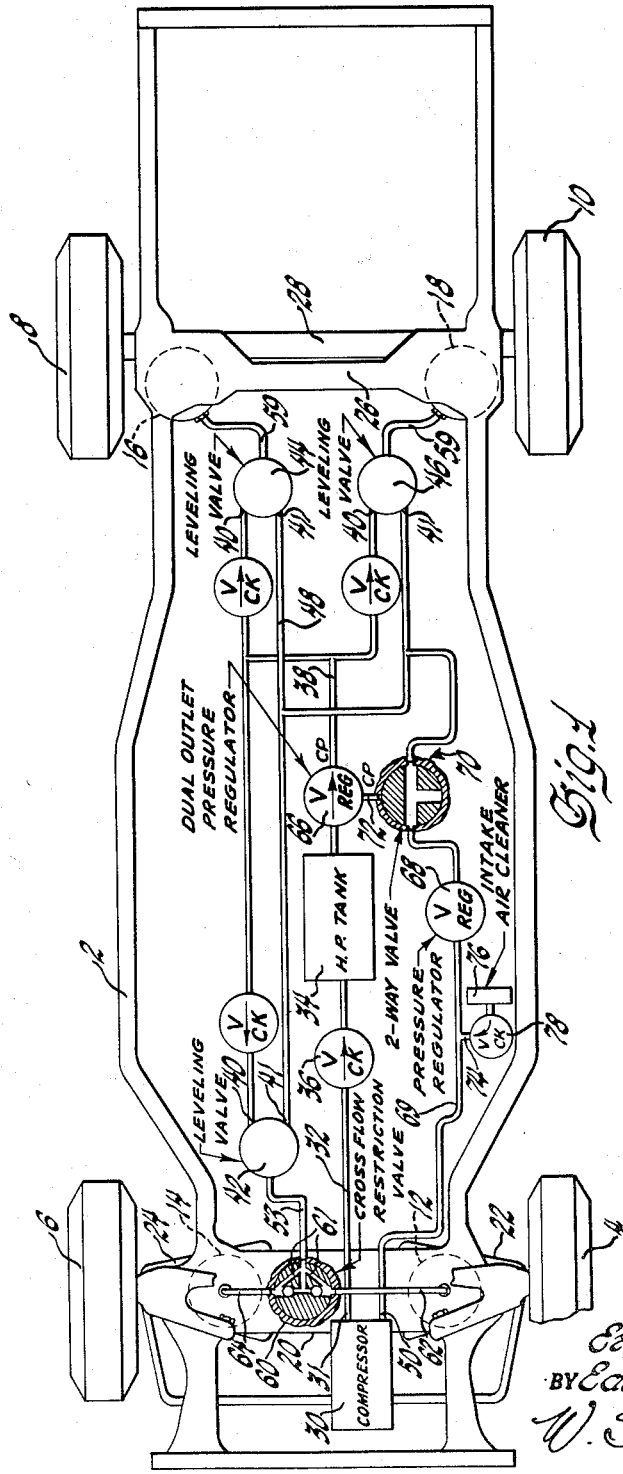
Fig. 1 is a schematic view of a vehicle chassis upon which is superimposed a diagrammatic fluid distribution network and control system embodying the present invention.
Figure 2:
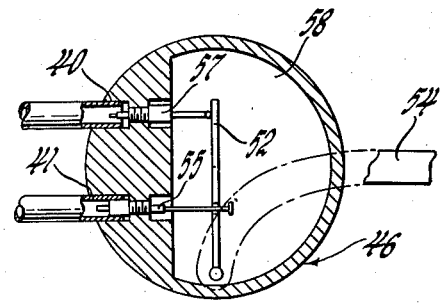
Fig. 2 is a diagrammatic view illustrating the general certain of the novel features of this invention.

Referring now to the drawings and particularly Fig. 1, there is illustrated a vehicle chassis comprising a frame 2 which is suspended relative to front wheels 4 and 6 and rear wheels 8 and 10 by means of air springs 12 and 14 and 16 and 18, respectively. Springs 12 and 14 are interposed between the front cross frame member 20 and the lower wishbone arms 22 and 24, respectively, while springs 16 and 18 are disposed between the rear cross frame member 26 and the rear wheel axle housing 28. To provide a supply of high pressure air for the springs, there is provided an engine driven compressor 30, the exhaust side 31 of which is connected by a conduit 32 to a high pressure storage tank 34. A check valve 36 in conduit 32 serves to prevent backflow of air from tank 34 to compressor 30 when the latter is inoperative. From tank 34 air passes through high pressure network 38 to the intake side 40 of each of three leveling valves 42, 44 and 46. It will be understood that only a single leveling valve 42 is utilized for both front springs in order to prevent hunting of the leveling system such as occurs when a separate leveling valve is employed at each of the four corners of the vehicle. Each of the leveling valves has an exhaust port 41 which is similarly connected to an air exhaust network 48 communicating with the inlet side 50 of compressor 30 to form a closed fluid circuit. As shown schematically in Fig. 2, each leveling valve is provided with a valve operating member 52 which is movable responsive to variation in vertical displacement between the frame 2 and adjacent wheel via linkage 54 (Fig. 2). Linkage 54 is adjusted so that increased vertical displacement above predetermined design height opens valve 55 in exhaust port 41, while decreased clearance opens intake valve 57 in intake port 40. Since both ports, in turn, communicate with the interior 58 of their respective leveling valves, air flows into or out of the associated spring through conduits 59 in accordance with the position of operator 52. Since the precise details of construction of the leveling valves form no part of the present invention, disclosure thereof has been limited to an elementary form, it being understood that any suitable type may be employed, as for example that shown in co-pending application Serial No. 519,598, Jackson et al., filed July 1, 1955, assigned to General Motors Corporation.

It will be noted that the conduit 53 associated with leveling valve 42 does not lead directly to springs 12 and 14 but rather first passes through a cross flow restriction valve 60 from which branch lines 62 and 64 extend to the respective springs 12 and 14. Valve 60 functions to allow unrestricted air flow from valve 42 into springs 12 and 14 but to restrict flow out of the springs 12 and 14, thereby preventing appreciable transfer of air between springs 12 and 14 when the vehicle is negotiating a turn. Flow out of springs 12 or 14 is impeded by closing of the respective ball checks so that exhaust air is required to pass through restrictions 61.

While leveling systems of the type thus far described have proved generally satisfactory, certain undesirable operational characteristics occasionally result, particularly where the operating pressure of the high pressure tank is maintained at a relatively high level in comparison with the normal pressure required in each of the springs to maintain the sprung mass at a desired standing height. By way of illustration, assume that the vehicle is progressing on a road surface which induces uniform vertical wheel oscillation of sufficient amplitude to cause the leveling valve operator 52 to oscillate alternately to exhaust and intake positions for approximately uniform time intervals. Under these circumstances, prolonged vehicle operation results in gradual progressive inflation of each of the four springs due to the fact that the relatively high pressure of intake air will cause more air to enter the springs during the stated interval than will be discharged from the springs into the exhaust line in the same time interval. In order to overcome this operational shortcoming in accordance with the present invention, high pressure network 38 has inserted therein immediately adjacent high pressure tank 34 a constant pressure outlet valve 66 which is adjusted to provide regulated outlet pressure of approximately 130 p.s.i. to the portion of network 38 leading to leveling valves 42, 44 and 46. Exhaust network 48, in turn, has inserted therein a constant pressure relief valve 68 which is initially adjusted to maintain a pressure of approximately 55 p.s.i. in the portion of low pressure network leading to the springs. Should the pressure therein rise above the stated level, valve 68 opens permitting excess pressure to enter the portion of the low pressure network between valve 68 and compressor 30. When used in conjunction with springs 12, 14, 16 and 18 designed for normal operating pressure of approximately 95 p.s.i., regulators 66 and 68 are effective to cause virtually uniform volume of intake and exhaust of air to and from the springs for uniform time intervals of operation of the leveling valves to their respective intake and exhaust positions since the pressure differential affecting movement of air into each spring is substantially equal to the pressure differential affecting movement of air out of each spring. In addition to allowing the use of relatively high pressures in tank 34, the improved system also permits elimination of the usual low pressure return tank in the exhaust network.

In accordance with another feature of the invention, the exhaust network 48 has interposed therein a manually operable two-way valve structure 70 which is connected in communicating relation with pressure regulator 66 by a conduit 72 through which air is delivered at the same controlled pressure as maintained in high pressure network 38. Valve 70 is manually operable 90° in a counterclockwise direction from the position shown to a second position providing communication between conduit 72 and the portion of exhaust network 48 between valve 70 and leveling valves 42, 44 and 46. For normal operation valve 70 is adjusted to cause uninterrupted flow of air through exhaust network 48, while blocking communication to conduit 72. However, upon movement of valve 70 to the other position, movement of exhaust air to the inlet side 50 of the compressor is blocked while the remaining exhaust network 48 is placed in communication with regulated high pressure air through conduit 72. Under these conditions, high pressure air is delivered to leveling valves 42, 44 and 46 through the exhaust sides thereof, causing all of the springs to be inflated until each wheel suspension rebound stop is engaged, thereby substantially increasing normal vehicle road clearance. The reason for the delivery of high pressure air into the springs under the conditions noted will be evident from reference to Fig. 2. As will be seen therein, the exhaust valve 55 is actuated by clockwise angular movement of operator 52. Hence, whenever the pressure in exhaust network 48 substantially exceeds the internal spring pressure acting on the opposite side of valve 55, the latter is urged to the open position by exhaust pressure even though no movement of operator 52 occurs. The increased pressure so induced in the spring causes expansion of the latter which, in turn, actuates linkage 54 in a clockwise direction thereby moving operator 52 to a position effective to maintain valve 55 open. As long as the valve 70 is left in the position described, the vehicle sprung mass will have increased ground clearance for negotiating exceptionally rough terrain which would normally be impassible at normal road clearance. In addition, if the vehicle frame should be jacked up for any purpose such as changing a tire, no significant interchange of air between the springs will occur.

As previously pointed out, relief valve 68 discharges pressure in excess of 55 p.s.i. into portion 69 of the low pressure network between valve 68 and compressor 30. Under certain circumstances, for example, when several passengers are discharged from the rear of the vehicle simultaneously, the pressure in the portion 69 of the low pressure network may become momentarily excessive. Conversely, under static conditions, even moderate pressure in this portion of the low pressure network may ultimately escape to atmosphere by leakage through a compressor body, thereby necessitating make-up air from atmosphere. In order to accommodate the diverse conditions noted, portion 69 of low pressure network 48 has interposed therein a conduit 74 communicating with atmosphere through intake air cleaner 76. In order to minimize the amount of make-up air from atmosphere while preventing excessive pressures from momentarily building up in the portion 69 of the low pressure network, conduit 74 has interposed therein a two-way check valve assembly 78 which functions to prevent escape of air from portion 69 as long as the pressure therein does not exceed 10 p.s.i., and to allow intake of air from atmosphere therethrough to make-up from atmosphere air losses resulting from momentary pressures in excess of 10 p.s.i. As seen best in Fig. 4, valve assembly 78 comprises a casing 80 having a pair of oppositely facing spring urged closure members 82 and 84 caged therein in axially aligned cavities 86 and 88. Closures 82 and 84 normally abut annular valve seats 90 and 92 in cavities 86 and 88, respectively. Seat 90 communicates with a diagonal drilled passage 94 which circumvents closure 84 to communicate with portion 69 of low pressure network 48 through conduit 74. Seat 92 communicates with a second diagonal passage 96 which circumvents seat 82 to communicate with atmosphere through conduit 98. To provide the required difference in pressure sensitivity for closures 82 and 84, spring 100 for the latter is calibrated to respond to a pressure of 1 p.s.i., while spring 102 which engages the former is calibrated to respond to a pressure of 10 p.s.i. The operation of the valve is as follows. When pressure in conduit 74 exceeds 10 p.s.i., closure 82 is unseated against the resistance of spring 102 and allows air to discharge to atmosphere through intake 76. Conversely, when additional air is required, very minor sub-atmospheric condition in conduit 74 causes unseating of the lightly biased closure 84 and allows air to enter portion 69 of low pressure network 48 through intake 76. Because of the dual function of valve 78, the system functions essentially as a closed system during normal dynamic conditions encountered in vehicle operation. That is, the intake air requirement of a compressor to maintain the high pressure tank at its design pressure is substantially met by air discharged into portion 69 of the low pressure network by valve 68. Hence, either discharge of air to atmosphere or replenishment therefrom occurs only infrequently and under essentially abnormal circumstances.

In addition to the features previously noted, a system according to the present invention affords the further distinct operational advantage of assuring minimum differential between intake pressure in network 38 and the temporarily increased pressure in the outboard springs occasioned by body roll in turns. Because of the slight pressure differential existing during such vehicle attitude, air flow into the outboard springs is so slight as to effect little, if any, height correction of the outboard side of the vehicle, thus assuring a more natural car "feel" during turns and particularly immediately following recovery to a straight ahead course. It will, of course, be understood that any height correction introduced while a vehicle is in a turn must necessarily be removed when the vehicle returns to a straight ahead course, since any correction introduced during a turn constitutes over-correction when the vehicle center of gravity returns to its normal location. The present system thus not only assures limited response to transient vehicle attitude, but also substantially lowers air consumption because of the reduced incidence of correction and correlary over-correction.

Fig. 5 illustrates a simplified version of the cross flow restriction valve 60 shown schematically in Fig. 1. In the embodiment shown, restriction of exhaust flow of air from springs 12 and 14 is accomplished by forming notches 61' in each of the frusto-conical ball seats. Notches 61' function in the same manner as restriction passages 61 previously described.

While but one embodiment of the invention has been shown and described, it will be evident that other changes and modifications may be made therein. It is, therefore, to be understood that it is not intended to limit the invention to the embodiment shown, but only by the scope of the claims which follow.

What is claimed is:

1. In a vehicle air suspension system of the type including a plurality of expansible springs controlled by leveling valves movable to intake or exhaust positions responsive to displacement between the sprung and unsprung mass of the vehicle, a source of high pressure air, a high pressure conducting network connecting said source with said leveling valves, a low pressure return network connecting said leveling valves with said source, a constant pressure outlet valve in said high pressure network, and a constant pressure relief valve in said low pressure return network, said last mentioned valves providing a pressure differential between the high pressure network and the springs and between the springs and the low pressure network which is substantially equal whereby the volume of air introduced or exhausted from said springs during corresponding time intervals is substantially equal.

2. In a vehicle air suspension system of the type including a plurality of expansible springs controlled by leveling valves movable to intake or exhaust positions responsive to displacement between the sprung and unsprung mass of the vehicle, a source of high pressure air, a high pressure conducting network connecting said source with said leveling valves, a low pressure return network connecting said leveling valves with said source, a constant pressure outlet valve in said high pressure network, a constant pressure relief valve in said low pressure return network, said valves providing a pressure differential between the high pressure network and the springs and between the springs and the low pressure network which is substantially equal whereby the volume of air introduced or exhausted from said springs during corresponding time intervals is substantially equal, and means operable to connect said high pressure network with said low pressure network, said last mentioned means being effective to prevent flow of air in said low pressure network to said relief valve.

3. In a vehicle air suspension system of the type including a plurality of expansible springs controlled by leveling valves movable to intake or exhaust positions responsive to displacement between the sprung and unsprung mass of the vehicle, a high pressure air storage tank, a compressor for supplying air to said tank, a high pressure conducting network connecting said tank with said leveling valve, a low pressure return network connecting said leveling valves with said compressor, a constant pressure outlet valve in said high pressure network between said tank and said leveling valves, a constant pressure relief valve in said low pressure return network between said leveling valves and said compressor, said last mentioned valves providing substantially equal pressure differentials between the high pressure network and the springs and between the springs and the low pressure network whereby the volume of air introduced or exhausted from said springs during corresponding time intervals is substantially equal.

4. In a vehicle air suspension system of the type including a plurality of expansible springs controlled by leveling valves movable to intake or exhaust positions responsive to displacement between the sprung and unsprung mass of the vehicle, a source of high pressure air, a high pressure conducting network connecting said source with said leveling valve, a low pressure return network connecting said leveling valves with said source, a constant pressure dual outlet valve in said high pressure network, a constant pressure relief valve in said low pressure return network, said last mentioned valves providing a pressure differential between the high pressure network and the springs and between the springs and the low pressure network which is substantially equal whereby the volume of air introduced or exhausted from said springs during corresponding time intervals is substantially equal, and a manually operable two-way valve interposed in said low pressure network and communicating with one outlet of said dual outlet valve, said two-way valve having one position permitting normal air flow through said low pressure network while blocking high pressure flow through said one outlet of said dual outlet valve and a second position permitting flow of high pressure air through said one outlet to said low pressure network while blocking flow in the latter to said relief valve.

5. In a vehicle air suspension system of the type including a plurality of expansible springs controlled by leveling valves movable to intake or exhaust positions responsive to displacement between the sprung and unsprung mass of the vehicle, a source of high pressure air, a high pressure conducting network connecting said source with said leveling valve, a low pressure return network connecting said leveling valves with said source, a constant pressure dual outlet valve in said high pressure network, a constant pressure relief valve in said low pressure return network, said last mentioned valves providing a pressure differential between the high pressure network and the springs and between the springs and the low pressure network which is substantially equal whereby the volume of air introduced or exhausted from said springs during corresponding time intervals is substantially equal, a manually operable two-way valve interposed in said low pressure network and communicating with one outlet of said dual outlet valve, said two-way valve having one position permitting normal air flow through said low pressure network while blocking high pressure flow through said one outlet of said dual outlet valve and a second position permitting flow of high pressure air through said one outlet to said low pressure network while blocking flow in the latter to said relief valve, and means associated with said leveling valves permitting movement of high pressure air through said low pressure network into said spring regardless of relative displacement of said sprung and unsprung mass of the vehicle when said two-way valve is in said second position.

6. In a vehicle air suspension system of the type including a plurality of air springs in which pressure is controlled by leveling valves movable from an intermediate off position to intake or exhaust positions responsive to related changes and displacement of the sprung and unsprung mass of the vehicle, an air compressor, a high pressure storage tank connected to the exhaust side of said compressor, a high pressure conducting network connecting said tank with said leveling valves, a low pressure return network connecting said leveling valves directly with the inlet side of said compressor, a relief valve effective to maintain a predetermined pressure in the portion of said low pressure network between said relief valve and said leveling valves, and a check valve in said low pressure network between said relief valve and said compressor, said check valve permitting movement of air from atmosphere into the portion of said low pressure network between said relief valve and said compressor to make up air expelled as a result of relief valve operation.

7. In a vehicle air suspension system of the type including a plurality of air springs controlled by leveling valves movable from an intermediate off position to intake or exhaust positions responsive to related changes in displacement of the sprung and unsprung mass of the vehicle, an air compressor, a high pressure storage tank connected to the exhaust side of said compressor, a high pressure conducting network connecting said tank with said leveling valves, a low pressure return network connecting said leveling valves directly with the inlet side of said compressor, a constant pressure outlet valve in said high pressure network, a constant pressure relief valve in said low pressure network, and a check valve in said low pressure network between said relief valve and said compressor, said check valve providing communication with atmosphere to make up air losses resulting from relief valve operation.

8. In a vehicle air suspension system of the type including a plurality of air springs controlled by leveling valves movable from an intermediate off position to intake or exhaust positions responsive to related changes and displacement of the sprung and unsprung mass of the vehicle, an air compressor, a high pressure storage tank connected to the exhaust side of said compressor, a high pressure conducting network connecting said tank with said leveling valves, a low pressure return network connecting said leveling valves directly with the inlet side of said compressor, and a pressure responsive relief valve in said low pressure network means enabling utilization of the latter as a low pressure storage chamber.

9. In a vehicle air suspension system of the type including a plurality of air springs controlled by leveling valves movable from an intermediate off position to intake or exhaust positions responsive to related changes and displacement of the sprung and unsprung mass of the vehicle, an air compressor, a high pressure storage tank connected to the exhaust side of said compressor, a high pressure conducting network connecting said tank with said leveling valves, a low pressure return network connecting said leveling valves directly with the inlet side of said compressor, and a two-way check valve in said low pressure network enabling utilization of the latter as a low pressure storage chamber, said last mentioned check valve being adjusted to provide relatively high resistance to movement of air from said low pressure network to atmosphere and relative low resistance to movement of air from atmosphere into said low pressure network.

10. In a vehicle air suspension system of the type including a plurality of air springs controlled by leveling valves movable from an intermediate off position to intake or exhaust positions responsive to related changes in displacement of the sprung and unsprung mass of the vehicle, an air compressor, a high pressure storage tank connected to the exhaust side of said compressor, a high pressure conducting network connecting said tank with said leveling valves, a low pressure return network connecting said leveling valves directly with the inlet side of said compressor, a constant pressure outlet valve in said high pressure network, a constant pressure relief valve in said low pressure network, and a two-way check valve in said low pressure network between said relief valve and said compressor, said check valve providing communication with atmosphere responsive to relatively high pressure in the portion of said low pressure network between the relief valve and compressor and communication from atmosphere to said portion of said low pressure network responsive to slight subatmospheric pressure in said network.

References Cited in the file of this patent

UNITED STATES PATENTS

| | | |
|---|---|---|
| 820,707 | Downer | May 15, 1906 |
| 1,105,805 | Liebowitz | Aug. 4, 1914 |
| 2,848,249 | Bertsch | Aug. 19, 1958 |